United States Patent
Ingalls

[11] Patent Number: 5,863,152
[45] Date of Patent: Jan. 26, 1999

[54] MECHANICAL GAS VENT

[76] Inventor: Peter Wayne Ingalls, 970 Windway Cir., Kissimmee, Fla. 34744

[21] Appl. No.: 597,482

[22] Filed: Feb. 1, 1996

[51] Int. Cl.[6] ............................................. B09B 1/00
[52] U.S. Cl. ..................... 405/129; 405/128; 588/249; 137/587
[58] Field of Search ................ 166/75.13; 210/901; 13/587; 405/53, 128, 129; 588/249, 250, 259, 261

[56] References Cited

U.S. PATENT DOCUMENTS

| 355,033 | 12/1886 | Schuetz | 137/587 X |
| 688,256 | 12/1901 | Mitchell | 137/587 |
| 1,556,001 | 10/1925 | McBride | 137/587 |
| 2,233,125 | 2/1941 | Gill | 137/587 X |
| 3,486,528 | 12/1969 | De Frees | 137/587 |
| 4,335,978 | 6/1982 | Mutch | 210/901 X |
| 4,672,366 | 6/1987 | Butts | 588/260 |
| 4,838,733 | 6/1989 | Katz | 405/129 |
| 5,120,161 | 6/1992 | Faussone | 405/129 |
| 5,562,586 | 10/1996 | Hyde-Smith | 588/250 |
| 5,641,245 | 6/1997 | Pemberton et al. | 405/128 |

Primary Examiner—George Suchfield

[57] ABSTRACT

A gas vent closing device that incorporates the use of a base member that is secured to a liner disposed over a collection pit. The base member includes a vented lower grate that allows for the passage of gaseous fumes therethrough. A cap member is slidably coupled with respect to the base member. The cap member can be seated within the base member after a desired amount of time in order to seal the pit and preclude the passage of the gaseous fumes.

1 Claim, 3 Drawing Sheets

MECHANICAL GAS VENT

BACKGROUND OF THE INVENTION

1. Field of the Invention

This invention relates to gas venting required during the construction and continuing maintenance of solid waste landfill closure projects and other synthetically lined facilities.

2. Description of the Prior Art

In general, no prior art exists that is comparable with the invention. The present method of field personnel cutting the liner to alleviate the "ballooning" effect caused by gas build-up under synthetic lined landfill closure projects has proven to be costly and at times even dangerous. The holes cut would require additional liner welded above the hole to reduce the chance of water infiltration. Eventually, the "doghouse" as it is known, must be repaired with a patch, a piece of liner welded over the gas opening. This is a major disadvantage because the liner subcontractor must remobilize to the site, thereby adding additional costs to the project. The remobilization costs can be exorbitant, depending on the liner subcontractors location at the time. The project completion schedule can also be severely delayed. This can result in additional costs due to potential fines imposed by governing regulatory agencies. Additionally, the potential for fire is eliminated during welding because the invention allows the methane gas to escape while welding the "skirt" of the invention to the liner material.

OBJECTS OF THE INVENTION

It is a general object of the present invention to provide a synthetic mechanical gas vent. It is a further object of the invention to provide a synthetic mechanical gas vent that will reduce project costs and time required for additional trips to the jobsite by the liner subcontractor to repair holes cut to allow trapped gas to exit. These and other objects of the invention will become clearly apparent from the following description when taken with the accompanying drawings.

BRIEF SUMMARY OF THE INVENTION

Landfill construction projects, for both new facilities and partial closures of active sites, have evolved from what we commonly referred to as "dumps" to high tech facilities. This is largely due in part to environmental concerns to protect our groundwater supplies from contamination from rainwater runoff, known as leachate.

In 1991, Subtitle D of the Resource Conservation and Recovery Act (RCRA) mandated regulations—minimum criteria—for new municipal solid waste landfills and lateral expansions of existing units. Many aspects of the regulations also apply to existing landfills. Landfill design technology has developed rapidly since the late 1970s and early 1980s. The two key elements driving modern landfill design are geosynthetics and environmental regulations. Subtitle D regulations require after an active landfill no longer accepts waste, a final cover must be installed. The final cover consists of an infiltration prevention layer and an erosion layer. The infiltration prevention layer is made up of a minimum of 18" of soil with a permeability less than or equal to the liner system in the base of the landfill cell, but no greater than $1 \times 10^{-5}$ cm/sec. The erosion layer must be at least 6" of soil that can sustain native plant growth. Typically, a synthetic liner is placed over the top of the full landfill cell to prevent water infiltration into the landfill, thereby, reducing leachate and the associated costs involved with treatment and handling.

During the installation of the final cover and subsequent synthetic liner, problems with the liner "ballooning" as a result of trapped landfill gases have caused considerable problems for contractors, engineers, and owners of landfills. This condition is usually a result of eroded areas due to rain during installation of cover soil over the liner, also a requirement of Subtitle D.

The ballooned areas must be dealt with on an ongoing basis by the contractor. If the balloon is allowed to continue to grow unchecked, the previously welded synthetic liner seams may be severely stretched beyond the material's maximum elasticity. Thereby creating a defect that must be repaired and/or replaced. Usually this occurs after the liner subcontractor has left the site creating another problem for the contractor, additional costs associated with remobilization.

The synthetic mechanical gas vent can be closed just prior to installing the final soil cover by the contractor alleviating the need for extra trips by the liner subcontractor, which also puts the contractor in charge of the project schedule.

Another very important aspect of the design of the synthetic mechanical gas vent is the "automatic closing function" of the device. For example, if by chance the vent is run over by construction equipment without the knowledge of the operator or Quality Control personnel, the vent is designed to self-close without the assistance of individuals. This is a significant feature the "doghouse" vent cannot provide.

DETAILED DESCRIPTION OF THE EMBODIMENT OF THE INVENTION

Figure 1:
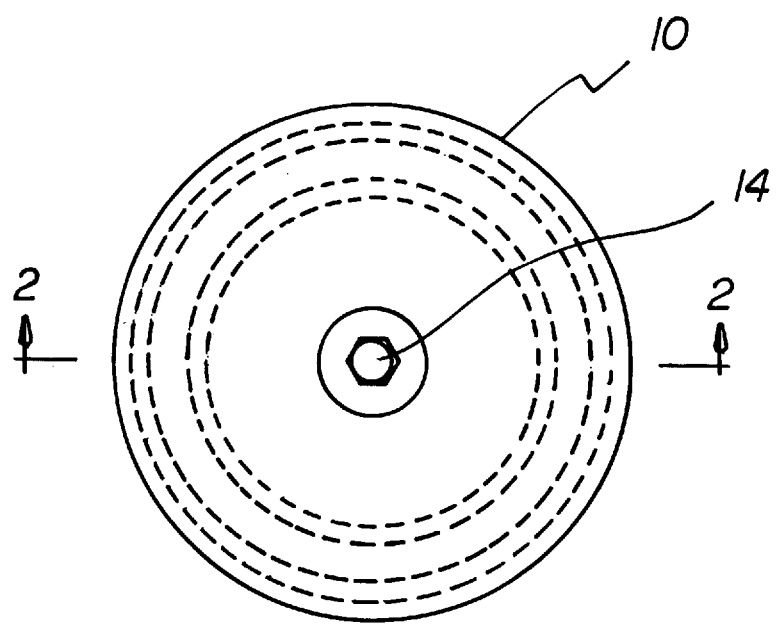
FIG. 1 shows a plan view of the mechanical gas vent in accordance with this invention.
Figure 2:
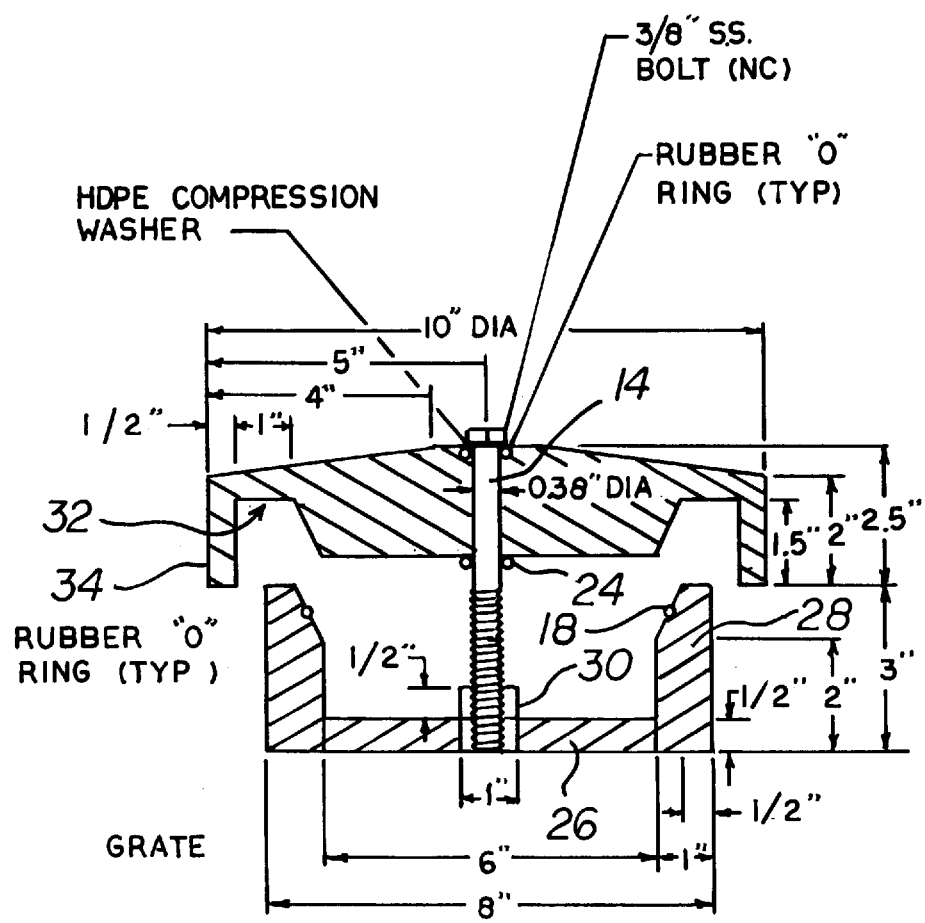
FIG. 2 shows a sectional view, or front elevation of the mechanical gas vent in accordance with this invention.
Figure 3:
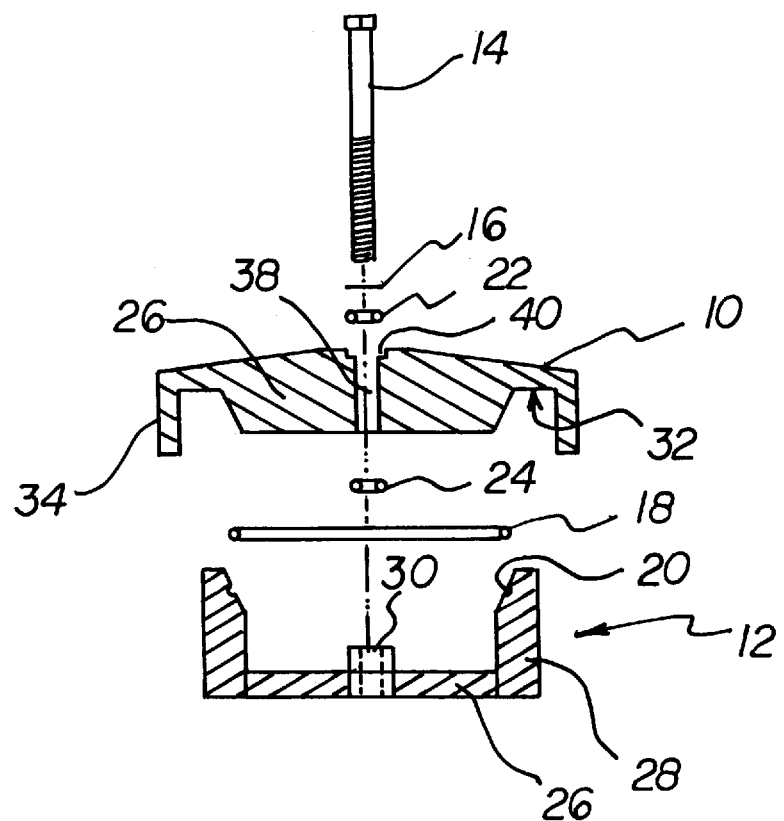
FIG. 3 is an exploded view of the gas vent in accordance with this invention.

The device shown in FIGS. 1, 2 and 3 include: 1 cap 10, 1 base 12, 1 stainless steel bolt 14, 3 rubber O-rings, and 1 O-ring compression washer 16. The cap, base, and O-ring compression washer will be made of high density Polyethylene (HDPE) or compatible material to attach to the liner system used on the project. The cap and base will be injection molded with the O-ring seat and bolt hole machined as needed.

The mechanical vent will be assembled by the purchaser in the field after the base has been attached to the liner or the pipe to prevent damage to the cap or O-ring seals. The base is welded, if made of HDPE, or glued, if made of Polyvinylchloride to the liner or pipe, The large O-ring 18 is then installed in the groove 20 provided in the tapered section of the base as shown in FIG. 2. The cap is assembled by placing the compression washer over the bolt against the head of the bolt and followed by a small O-ring 22. The bolt is then inserted through the cap's center hole so the small O-ring sits in the seat shown in FIG. 2. There is then a second O-ring 24 placed over the bolt with a fit to support the cap and hold the vent open. This assembly is then threaded into the base 3–4 complete turns. The vent is now installed. If any material hits the cap, it will slide the second O-ring and close the vent. When the soil cover gets close to this area, and the vent is no longer needed, the bolt is tightened down with a wrench and the opening through the liner or pipe is sealed.

The vent will be manufactured in various sizes for differing conditions. Four models will be available, as follows: four (4) inch, six (6) inch, eight (8) inch and twelve (12) inch versions.

The six (6) inch model is shown on the drawings.

The base member 12 has a generally U-shaped cross-section. The base member 12 includes a lower horizontal portion 26 and an upwardly extending cylindrical upper portion 28. The lower horizontal portion 26 is comprised of a grate. The lower horizontal portion 26 is securable within an aperture through a synthetic lined area. The upper portion 28 is defined by a tapered open upper end. The tapered open upper end has an annular groove 20 extending around an inner peripheral surface thereof. The annular groove 20 has a large O-ring 18 secured therein. The lower horizonal portion 26 has an internally threaded collar 30 extending upwardly therefrom. The cap member 10 couples with the base member 12. The cap member 10 has an annular recess 32 formed within a lower surface thereof. The annular recess 32 creates an outer lip portion 34 and an inner hub portion 36. The inner hub portion 36 is dimensioned for being received within the tapered open upper end whereby the outer lip portion 34 encompasses the base member 12. The cap member 10 has a central opening 38 therethrough. The central opening 38 aligns with the collar 30 of the base member 12. The central opening 38 has a recessed upper end 40. A bolt 14 couples the cap member 10 to the base member 12. The bolt 14 has a threaded lower end. The bolt 14 extends through the central opening 38 of the cap member 10 with the threaded lower end securing to the internally threaded collar 30 of the base member 12. The bolt 14 has a compression washer 16 disposed thereon for positioning within the recessed upper end 40 of the central opening 38. A small O-ring 22 is coupled with the bolt 14 disposed below the compression washer 16. A second O-ring 24 is coupled with the bolt 14 disposed below the lower surface of the cap member 10 for supporting the cap member 10 at an elevated position above the base member 12. Once pressure is exerted on the cap member 10, by soil and the like, the pressure will cause the cap member 10 to slide downwardly against the friction of the second O-ring 24 until the cap member 10 is seated within the base member 12, at which time the bolt can be tightened with respect to the collar 30 to secure the cap member 10 to the base member 12.

From the foregoing description, it will be evident that the present invention is susceptible of numerous and varied embodiments which are adapted for various particular applications. However, while in the foregoing description and the accompanying drawings, there have been disclosed several specific preferred embodiments of the present invention, it is to be understood that various modifications, omissions, and refinements which depart from the specific disclosed embodiments may be adopted without departing from the spirit and scope of this invention.

I claim:

1. A mechanical gas vent, comprising:

a base member having a generally U-shaped cross-section, the base member including a lower horizontal portion and an upwardly extending cylindrical upper portion, the lower horizontal portion being comprised of a grate, the lower horizontal portion being securable within an aperture through a synthetic lined area, the upper portion being defined by a tapered open upper end, the tapered open upper end having an annular groove extending around an inner peripheral surface thereof, the annular groove having a large O-ring secured therein, the lower horizonal portion having an internally threaded collar extending upwardly therefrom;

a cap member coupling with the base member, the cap member having an annular recess formed within a lower surface thereof, the annular recess creating an outer lip portion and an inner hub portion, the inner hub portion being dimensioned for being received within the tapered open upper end whereby the outer lip portion encompasses the base member, the cap member having a central opening therethrough, the central opening aligning with the collar of the base member, the central opening having a recessed upper end;

a bolt coupling the cap member to the base member, the bolt having a threaded lower end, the bolt extending through the central opening of the cap member with the threaded lower end securing to the internally threaded collar of the base member, the bolt having a compression washer disposed thereon for positioning within the recessed upper end of the central opening, a small O-ring coupled with the bolt disposed below the compression washer, a second O-ring coupled with the bolt disposed below the lower surface of the cap member for supporting the cap member at an elevated position above the base member.

\* \* \* \* \*